(12) United States Patent
Lan

(10) Patent No.: US 6,791,221 B1
(45) Date of Patent: Sep. 14, 2004

(54) SPINNING TOP ROTOR GENERATOR SYSTEM

(76) Inventor: Chung Ho Lan, 190 Middle Road, #03-21 Fortune Centre, Singapore 188979 (SG)

( * ) Notice: Subject to any disclaimer, the term of this patent is extended or adjusted under 35 U.S.C. 154(b) by 0 days.

(21) Appl. No.: 10/440,616

(22) Filed: May 19, 2003

(51) Int. Cl.[7] ................................................ H02K 5/00
(52) U.S. Cl. .......................... 310/89; 310/91; 310/113
(58) Field of Search ...................... 310/89–91, 102 R, 310/113

(56) References Cited

U.S. PATENT DOCUMENTS

| | | | | |
|---|---|---|---|---|
| 4,168,459 A | * | 9/1979 | Roesel, Jr. ................. | 322/29 |
| 5,065,060 A | * | 11/1991 | Takahashi et al. ............ | 310/74 |
| 5,254,893 A | * | 10/1993 | Ide .............................. | 310/90 |
| 6,043,577 A | * | 3/2000 | Bornemann et al. .......... | 310/74 |
| 6,291,914 B1 | * | 9/2001 | Mukaiyama .............. | 310/68 B |

* cited by examiner

Primary Examiner—Thanh Lam
(74) Attorney, Agent, or Firm—Bucknam and Archer

(57) ABSTRACT

A spinning top rotor generator system comprises: a stator including a plurality of windings provided on an armature iron core; a rotor supported at the center of the stator by means of a rotary structure, a pole iron core having a plurality of windings provided thereon for generating a magnetic flux, by an external direct current power source applied therefor, to generate a revolving magnetic field and then induce an electromotive force on the stator armature correspondingly, by which an alternating current is outputted through a plurality of leads connected to the armature windings when the rotor rotates; wherein the stator and the rotor are held by flexible frames to be normal to each other, a downward end of the rotor shaft having a tapered tip supporting a majority of weight by the end thereof on a bearing base; a auxiliary motor, held flexibly on the top of the generator rotor, driving another end of the rotor shaft to turn the rotor turning around the tapered tip, functioned as the rotation center. In this manner, the most electrical energy may be converted from the least driving mechanical energy with a minimal loss.

6 Claims, 2 Drawing Sheets

SPINNING TOP ROTOR GENERATOR SYSTEM

BACKGROUND OF THE INVENTION

1. Field of the Invention

The present invention relates to a spinning top rotor generator system, particularly to an upright type rotor generator turning around a tapered tip of the shaft thereof, functioned as the rotation center, having the most electrical energy converted from the least driving mechanical energy with a minimal loss.

2. Related Arts

A conventional generator system diagrammatically shown in FIG. 1, for example, is a synchronous machine 1, comprising a stator 11 including a plurality of windings 12 provided on an armature iron core; a rotor 13 supported at the center of the stator 11 by means of a rotary structure, a pole iron core having a plurality of windings 14 provided thereon for generating a magnetic flux, by an external direct current power source 15 applied therefor, to generate a revolving magnetic field and then induce an electromotive force on the stator 11 armature correspondingly, by which an alternating current is outputted through a plurality of leads 121 connected to the armature windings 12 when the rotor 13 rotates. The conventional synchronous machine 1 is designed as a horizontal type having poor features, due to the construction itself, as follows: (1) The weight of the rotor itself is a great loading for the dynamic energy, especially in large machines, due to the horizontal type design. (2) The rotation of the rotor is not smooth since the force applied for the bearings provided on the stator yoke iron is uneven due to the weight of the rotor itself. (3) A large prime driver is required, and the dynamic loss is greater, etc.

Additionally, a conventional upright type hydroelectric power generator system 2 is shown in FIG. 2, as example, wherein water W drawn the dam and flushing downwardly is directed rushing against a series of blades 21, driving the blades 21 by the pressure thereof, allowing a helm 22 turning an axle center 23 to drive a generator 24 provided there above for the generation of power. Although water, being a convenient source of energy owing to the unfailing supply from rain, recycling, and environment-friendly, is utilized by the conventional upright type hydroelectric power generator system 2, there are inherent disadvantages as follows: (1) A reservoir is required with an extremely high cost. (2) Generating power in the dry season is incapable. (3) Incessantly generating power is performed in the wet season, with a lower efficiency due to the non-storable surplus power generated at off-peak. (4) It is hard to be maintained since water must be blocked therefor. (5) The helm 22 is provided under the blades 21 resulting in a greater dynamic energy loss.

SUMMARY OF THE INVENTION

The primary object of the present invention is to provide a spinning top rotor generator system having the most electrical energy converted from the least driving mechanical energy with a minimal loss.

For the purpose of achieving above-mentioned object, the spinning top rotor generator system of the present invention comprises: a stator including a plurality of windings provided on an armature iron core; a rotor supported at the center of the stator by means of a rotary structure, a pole iron core having a plurality of windings provided thereon for generating a magnetic flux, by an external direct current power source applied therefor, to generate a revolving magnetic field and then induce a electromotive force on the stator armature correspondingly, by which an alternating current is outputted through a plurality of leads connected to the armature windings when the rotor rotates. The stator and the rotor are held by a plurality of flexible frames, including several resilient elements in a horizontal direction and a vertical direction, to be normal to each other, a downward end of the rotor shaft having a tapered tip supporting a majority of weight by the end thereof on a bearing base; moreover, an auxiliary motor, held flexibly on the top of the generator rotor and shafts of both of them being interconnected with each other via an universal joint, driving the other end of the rotor shaft to turn the rotor turning around the tapered tip, functioned as the rotation center.

As described above, the tapered tip of the shaft is served as the rotation center of the upright type rotor, such that a little friction force and a minimal dynamic energy loss upon rotating may be obtained, and also, the weight of the rotor itself may facilitate the rotational-inertia dynamic energy of the rotor. Thus, the most electrical energy may be converted from the least driving mechanical energy applied for the rotor.

DETAILED DESCRIPTION OF THE INVENTION

The technical features of the present invention will be further described in conjunction with an embodiment. The embodiment is merely a preferred example and not to be construed as limiting the scope of the present invention. The best understanding will be obtained by reference to the following detailed description together with the accompanying drawings.

Figures 1, 2:
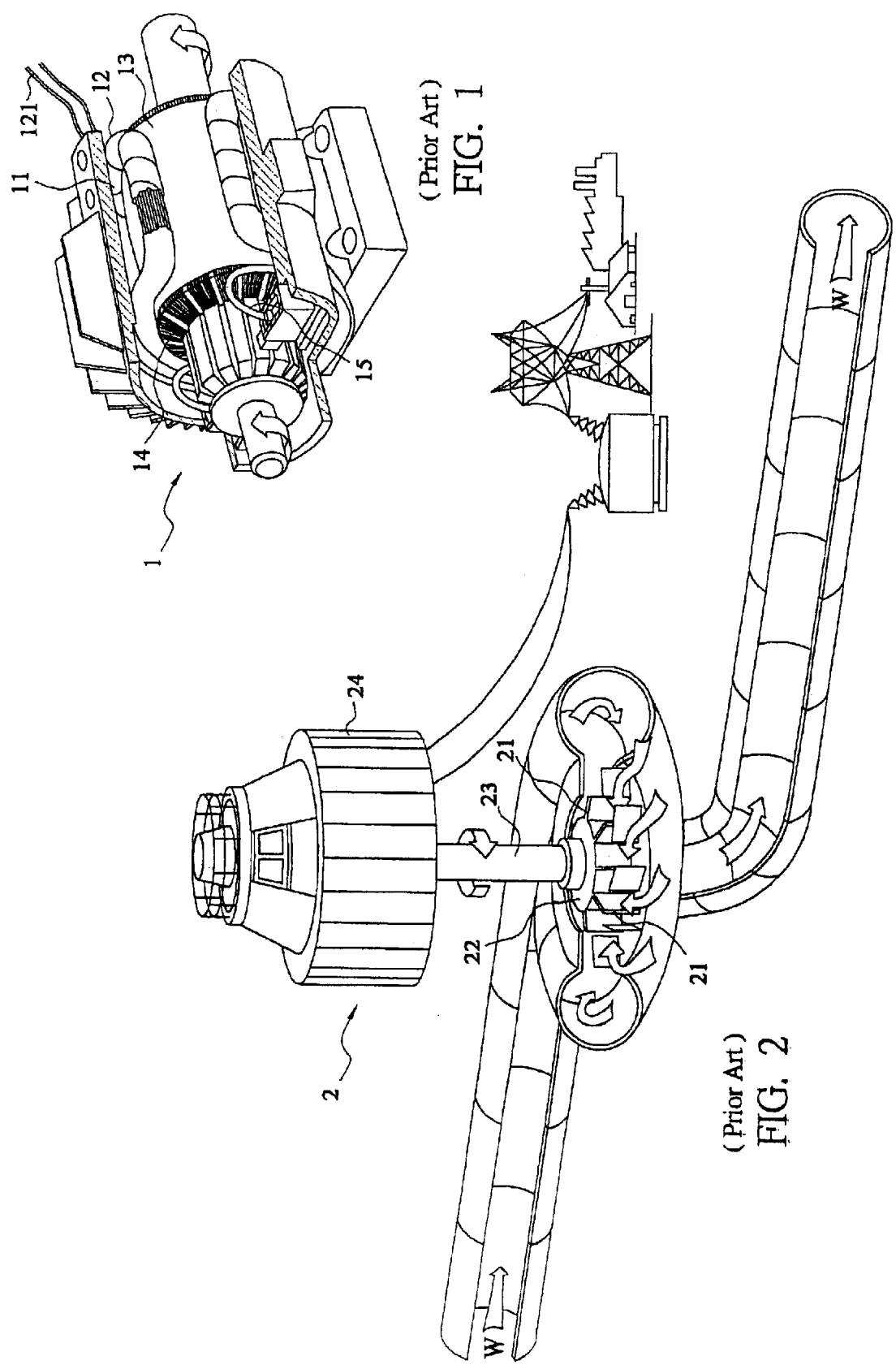
FIG. 1 is a diagrammatic view of a conventional horizontal type synchronous machine.
FIG. 2 is a diagrammatic view of a conventional upright type hydroelectric power generator system.
Figure 3:
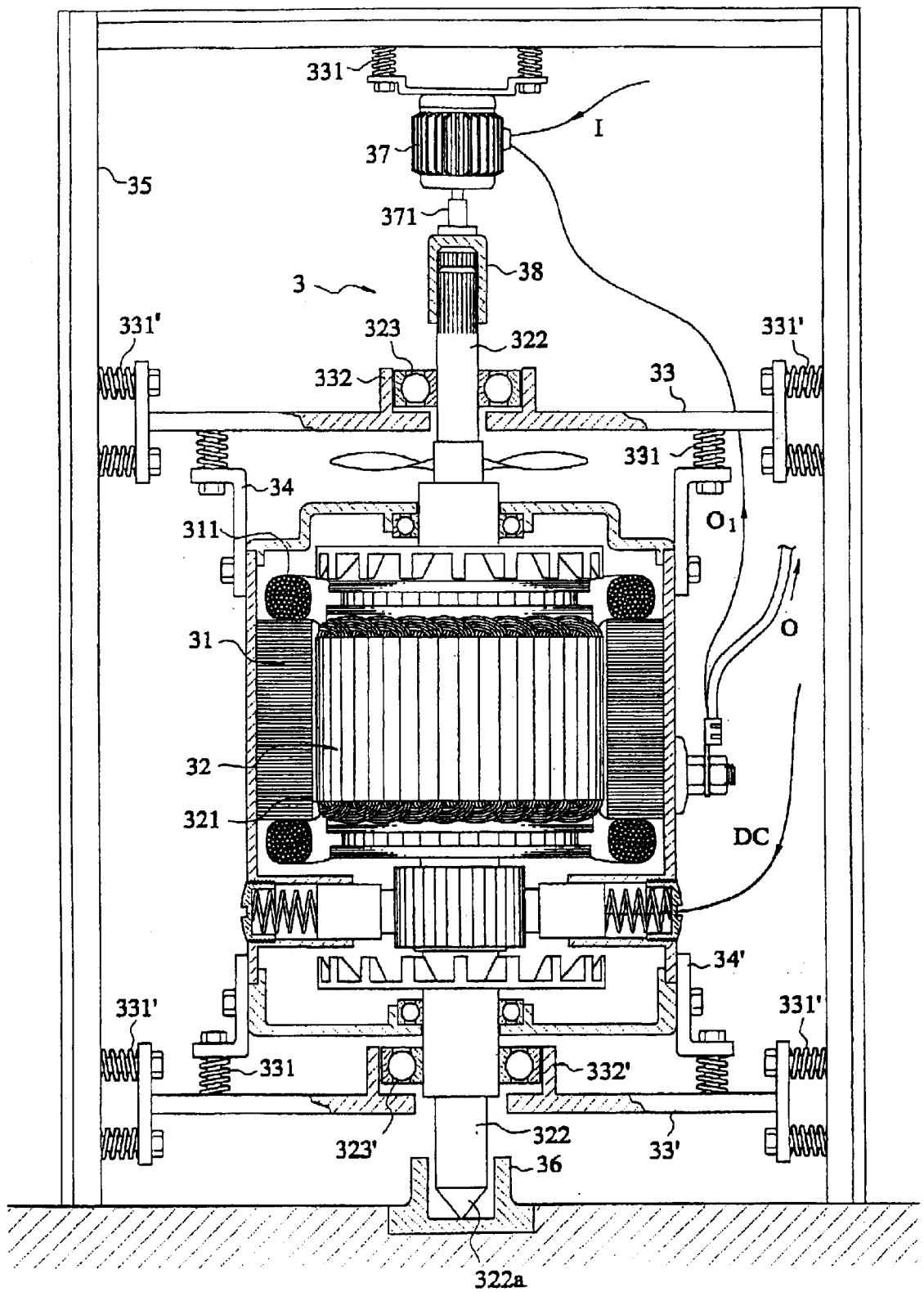
FIG. 3 is a diagrammatic view of a spinning top rotor generator system of the present invention with partially sectioned, wherein wires of circuit are diagrammatically represented by single lines.

Firstly, referring to FIG. 3, wires of circuit in the figure are all diagrammatically represented by single lines due to the fact that the present invention is irrespective of the field of the phase and the wiring. As shown in the figure, the basic structure and principle for a spinning top rotor generator system 3 of the present invention may be substantially identical to that of the conventional synchronous machine, the spinning top rotor generator system having:

a stator 31 including a plurality of windings 311 provided on an armature iron core, a rotor 32 supported at the center of the stator 31 by means of a rotary structure, a pole iron core having a plurality of windings 321 provided thereon for generating a magnetic flux, by an external direct current power source DC applied therefor, to generate a revolving magnetic field and then induce an electromotive force on the stator 31 armature correspondingly, by which an alternating current O is outputted through a plurality of leads connected to the armature windings 311 when the rotor 32 rotates.

The differences between the present invention and the conventional one are that a plurality of frames 33, 33'; 34, 34' may be included to hold the stator 31 and the rotor 32 in a rigid frame 35 to be normal to each other, the frames 33,33'; 34, 34' maintaining a flexibility with respect to the rigid frame 35 within a tolerance region by several resilient elements 331, 331' provided in horizontal and vertical directions, and also allowing for a swing in the horizontal direction or a jump in the vertical direction, etc., being produced by the torsion, of the stator 31 and the rotor 32. At the supporting interface between the rotor 32 and the flexible frames 33, 33', bearings 323, 323' are provided on two ends of a shaft 322 of the rotor, respectively, and corresponding bearing bases 332, 332' are also provided on the frames 33, 33', respectively. A releasable joint presented between the bearings and the bearing bases may allow for the jump of the shaft 322 produced by the torsion.

In accordance with the present invention, a downward end of the rotor 32 shaft 322 may have a tapered tip 322a supporting a majority of weight of the rotor 32 and the stator 31 on a bearing base 36. Additionally, an auxiliary motor 37 may be flexibly held, by a plurality of resilient elements 331, on the top of the generator 32. A shaft 371 of the motor 37 is interconnected to the generator rotor 32 shaft 322 via a bushing 38, for driving the rotor 32 shaft 322 to turn the rotor turning around the tapered tip 322a, functioned as the rotation center. According to the present invention, the bearing base 36 must be made from an anti-friction material, preferably formed with a guiding incline 361 and lubricated appropriately, since the most part of the weight of the generator including the rotor 32 and the stator 31 may be concentrated at the tip 322a of the shaft 322, where the rotation center is resided.

In this manner, the tapered tip 322a of the shaft 322 is served as the rotation center of the upright type rotor 32, such that a little friction force and a minimal dynamic energy loss upon rotating may be obtained, and also, the weight of the rotor 32 itself may facilitate the rotational-inertia dynamic energy of the rotor 32; additionally, in accordance with the present invention, a more external current I is required to start the auxiliary motor 37 when driving the resting generator rotor 32. After operating, a small part O1 of the current O outputted from the generator may be fed back for operating the auxiliary motor 37; thus the most electrical energy may be converted form the least driving mechanical energy applied for the rotor 32.

To sum up, the spinning top rotor generator system according to the present invention is truly an invention with novelty, advancement or non-obviousness, and availability by industrial, due to the fact that the tapered tip of the shaft of the upright type rotor is served as the rotation center, such that a little friction force, a minimal dynamic energy loss upon rotating may be obtained, and also the weight of the rotor itself may facilitate the rotational-inertia dynamic energy of the motor, the most electrical energy thus may be converted from the least driving mechanical energy applied for the rotor.

LIST OF REFERENCE SYMBOLS 3 spinning top rotor generator system of the present invention 31 stator
311 winding
32 rotor
321 winding
322 shaft
322a tapered tip
323' bearing
33,33',34,34' frame
331,331' resilient element
332,332' bearing base
35 rigid frame
36 bearing base
37 auxiliary motor
371 shaft
38 bushing

What is claimed is:

1. A spinning top rotor generator system comprising:

a stator including a plurality of windings provided on an armature iron core; a rotor supported at a center of said stator by means of a rotary structure, a pole iron core having a plurality of windings provided thereon for generating a magnetic flux, by an external direct current power source applied therefor, to generate a revolving magnetic field and then induce an electromotive force on said stator armature correspondingly, by which an alternating current is outputted through a plurality of leads connected to said armature windings when said rotor rotates; characterized in that:

said stator and said rotor are held by flexible frames to be normal to each other, a downward end of said rotor shaft having a tapered tip supporting a majority of weight by an end thereof on a bearing base; an auxiliary motor held flexibly on the top of said generator rotor, driving the other end of said rotor shaft to turn said rotor turning around said tapered tip, functioned as a rotation center.

2. The spinning top rotor generator system according to claim 1, wherein shafts of said auxiliary motor and said generator rotor are interconnected with each other via a bushing.

3. The spinning top rotor generator system according to claim 1, wherein interfaces between two ends of said rotor shaft and said flexible frames are held by bearings and bearing bases, respectively.

4. The spinning top rotor generator system according to claim 3, wherein a releasable joint is presented between said bearings and bearing bases, allowing for a jump, produced by the torsion, occurring therebetween.

5. The spinning top rotor generator system according to claim 1, wherein a small portion of said current outputted from said generator is fed back for operating said auxiliary motor.

6. The spinning top rotor generator system according to claim 1, wherein said flexible frames include a plurality of resilient elements provided in a horizontal direction and a vertical direction.

* * * * *